Jan. 17, 1928.                                                    1,656,728
K. DE LONY
CONSTRUCTION FOR COMPRESSORS AND THE LIKE
Filed Jan. 25, 1924
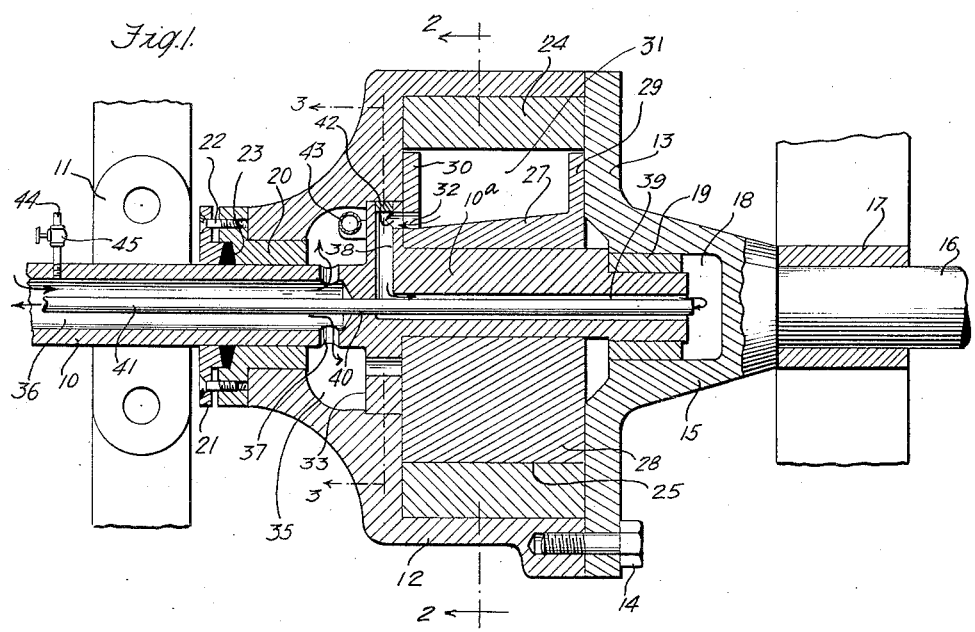
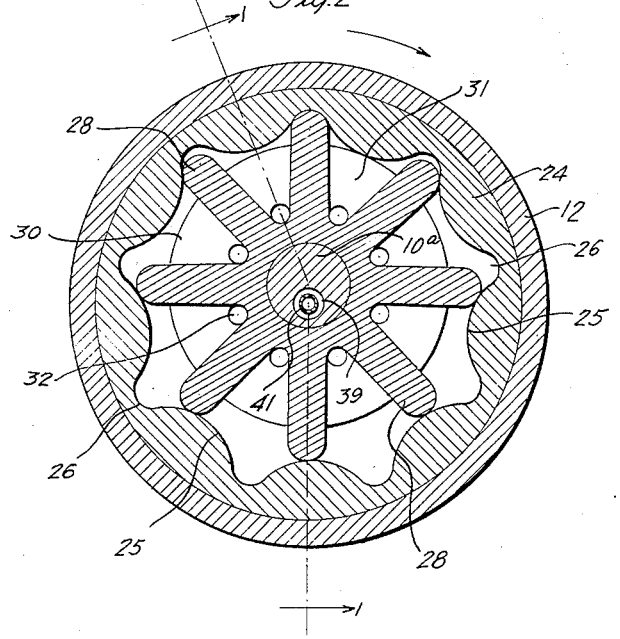
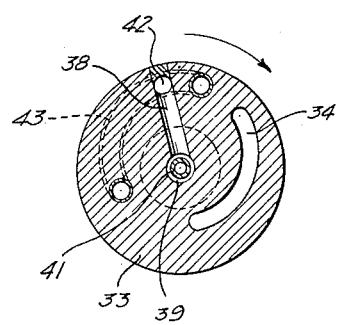
Inventor
Knud De Lony
By his Attorney
Robert S. Blair Patented Jan. 17, 1928.

1,656,728

UNITED STATES PATENT OFFICE.

KNUD DE LONY, OF NEW HAVEN, CONNECTICUT, ASSIGNOR TO THE SAFETY CAR HEATING & LIGHTING COMPANY, A CORPORATION OF NEW JERSEY.

CONSTRUCTION FOR COMPRESSORS AND THE LIKE.

Application filed January 25, 1924. Serial No. 688,569.

This invention relates to construction for compressors and the like. One of the objects thereof is to provide a construction of the above nature dependable in action and capable of operating with a high degree of efficiency. Another object is to provide a construction of the above nature adapted to operate reliably at all times under varying conditions of practical use. Another object is to provide such a construction capable of long continued service without being affected by wear. Another object is to provide a construction of the above nature wherein the parts are compactly disposed and conveniently accessible. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is a longitudinal section, the section being taken substantially along the line 1—1 of Figure 2.

Figure 2 is a transverse section taken substantially along the line 2—2 of Figure 1, and Figure 3 is a transverse section of parts of the apparatus, the section being taken substantially along the line 3—3 of Figure 1.

Similar reference characters refer to similar parts throughout the several views of the drawing.

Referring now to the drawing in detail, there is shown a shaft 10 which is preferably stationary, being illustratively shown as rigidly secured in a suitable support 11. About this shaft 10 is an outer casing which comprises a hollow casing member 12, the right-hand end of which is closed by a plate member 13. The plate member 13 is removably secured to the casing member 12 as by means of bolts 14 and has formed integrally therewith a projecting portion 15 which terminates in a shaft or trunnion 16. The shaft or trunnion 16 is rotatably supported in a suitable bearing indicated at 17. The plate member 13 is preferably provided with a hollow portion 18 within the part 15 into which the end of the stationary shaft 10 projects and wherein the right hand member 13 of the casing has a bearing upon the shaft 10 as indicated at 19. The left-hand end of the outer casing comprising the members 12 and 13 is rotatably supported upon the shaft 10 as by a bearing member 20. Preferably a collar 21 is provided about the shaft 10 secured to the bearing member 20 as by screws 22 and between this collar 21 and the member 20 is interposed a packing ring 23, the purpose of which will be later apparent. The outer casing is adapted to be driven by a suitable source of power applied to the shaft 16 or by suitable means applied to the periphery of the casing and when so driven the casing rotates freely upon its bearings 17, 19 and 20.

Within the casing member 12 and securely held therein and clamped by the plate 13 to rotate therewith, is an annular member 24 which, for the sake of convenience and clarity, will be termed the outer rotor. As shown in Figure 2, the inner surface of this outer rotor 24 is provided with a plurality of regularly formed and evenly spaced ridges and grooves 25 and 26 respectively.

The stationary shaft 10 at its part within the outer rotor 24 is provided with an eccentric portion $10^a$. Rotatably mounted upon this eccentric portion $10^a$ is the hub 27 of a member which will be referred to as the inner rotor. This inner rotor comprises a plurality of radially extending members 28, similar to vanes, and webs 29 and 30 at either side thereof which respectively contact the inner surface of the plate member 13 and the inner surface of the casing member 12 as shown in Figure 1. As shown in Figure 2 these webs 29 and 30 are not of sufficient radial dimension to interfere with the eccentric movement of the inner rotor within the outer rotor 24.

The eccentric inner rotor is driven by the outer rotor 24 through the ridges 25 upon the inner surface of the outer rotor engaging the end portions of the vanes 28. In the embodiment shown in the drawing there are provded nine recesses or grooves 26 upon the outer rotor 24 and eight radial partitions or vanes 28 comprising the inner rotor. The ends of the vanes 28 are rounded to substantially mate with the grooves 26. The parts are preferably so proportioned that during the eccentric movement of the inner rotor within the outer rotor the ends of the vanes 28 are at all times substantially in contact with some portion of the surface of the rotor 24, as is brought out in Figure 2. That is when the end of one vane 28 is at its farthest eccentric position from the axis of the shaft 10 resting within a groove 26, the opposite vane, being in its eccentric position nearest to the axis of the shaft 10, just rides over the crest of the ridge 25 opposite the said groove. This contact of the ends of all of the vanes 28 at all times with the surface of the outer rotor is, however, not essential, as will later appear, many advantages of this invention being attained if the inner and outer rotors are so designed and proportioned that contact between each particular vane and the surface of the outer rotor occurs during only part of the rotation, notably when that particular vane is carrying the drive or part of the drive between the two rotors. The inner rotor is continually in driving engagement with the outer rotor through the vanes 28 engaging the side surfaces of the ridges 25 and, as will be seen, in the embodiment shown in the drawing this drive is a slipping drive, the outer rotor slipping backwardly relative to the inner rotor to the extent of one ridge 25 during each rotation and the drive therefore being progressively carried by different vanes.

The vanes 28 and webs 29 and 30 of the inner rotor form therein a plurality of substantially radial recesses 31 which converge toward the center of the rotor. The outer rotor substantially forms a closure for the mouths of these recesses of the inner rotor thus forming between the two rotors a plurality of chambers or compartments. As the apparatus is rotated these compartments move with an eccentric motion about the axis of the stationary shaft 10. Due to the eccentric relation of the inner rotor to the outer rotor the surface of the outer rotor bounding each chamber moves inwardly relative to the other walls of the chamber toward the axis of the shaft during one-half of each revolution, and outwardly again during the remainder of the revolution. The effect of this is to alternately increase and decrease the volume of each of the chambers 31. For example, as shown in Figure 2, the two lowermost chambers are at substantially maximum volume and the two uppermost chambers are at substantially minimum volume. The degree of change in volume of the chambers 31 during rotation is enhanced by the grooves 26 and ridges 25, it being seen that when a given chamber is at its eccentric position nearest the center of the shaft 10, a groove 26 forms its outer wall and that when the same chamber is at its eccentric position farthest from the axis of the shaft 10, a ridge 25 forms its outer wall.

In operation the apparatus preferably carries a certain amount of liquid such as a suitable oil which is contained in the chambers 31. As the inner and outer rotors rotate together, this oil is thrown outwardly by centrifugal force against the inner surface of the outer rotor 24. This oil therefore forms a continual seal between the inner and outer rotors. The amount of oil carried by each chamber 31 only partly fills the chamber, the remaining portion thereof nearest the axis of rotation being occupied by the gas or other fluid which is to be compressed.

Each of the chambers 31 is provided with an opening 32 at the base thereof passing through the webs 30. The stationary shaft 10 has formed thereon a flange 33 against the inner side of which the webs 30 rub as the rotors are rotated as above described. This flange 33 has therein a passage-way or slot 34, best shown in Figure 3, with which the openings 32 in the webs 30 are adapted to register as they move thereby and by means of which the chambers 31 are placed in communication with a chamber 35. The left-hand end of the stationary shaft 10 is preferably hollow providing a passage 36 which is in communicaton with the chamber 35 through passages 37. It will be seen therefore that when a chamber 31 is in such position that its opening 32 is in registry with the slot 34, a passage for fluid is provided from the passage 36 in the shaft 10 to that chamber 31.

In the flange 33 is also provided a passage 38 which communicates with a passage 39 extending through the center of the shaft 10 to its right-hand end and opening into the chamber 18 within the plate member 13. Extending axially through the shaft 10 and supported at 40, is a pipe 41 opening into the chamber 18. The passage 38 has an opening 42 with which the openings 32 of the chambers 31 are adapted to register as they move thereby.

The inner and outer rotors rotate in the direction indicated by the arrows in Figs. 2 and 3. The passage 36 in the shaft 10 is connected to a source of supply of the gas or other fluid which is to be compressed. The passage 34 in the flange 33 is so positioned that the opening 32 of each chamber 31 registers with the passage 34 when the chamber 31 is in that part of its rotation during which its volume is increasing. In this manner a supply of gas is sucked into each chamber 31, through the passages 36 and 37, chamber 35 and passage 34, as indicated by the arrows in Figure 1. This gas occupies the portion of the chamber 31 nearest the axis left vacant by the oil as above described.

When a given chamber 31 has moved to the position in which its volume is substantially a maximum, its opening 32 moves out of communication with the passage 34 and the chamber is closed. The volume of the rotating chamber now begins to decrease. The oil in the outer portions of the chamber being relatively non-compressible, its volume remains substantially constant and the volume of the entrapped gas is decreased. Thus during that portion of the movement of a chamber 31 during which its volume is decreasing the gas entrapped therein is compressed. At a point just before the volume of the rotating chamber 31 reaches its minimum the opening 32 thereof comes into registry with the passage 42 and the compressed gas is discharged through the passages 38 and 39 and out through the pipe 41.

The operation above described is successively repeated with each rotating chamber 31. As has been described above, the oil or other liquid within the chambers forms a seal and therefore the only leakage which can occur is leakage of oil between adjoining chambers. The leakage of a liquid through narrow spaces between surfaces is so small as to be substantially negligible and it will therefore be seen that the volumetric efficiency of the apparatus described is very high.

In order to take care of any compressed gas which may remain in the chambers 31 after discharge through the outlet passage 42, a by-pass 43 is provided which, just after discharge, places the compression chamber in communication with another compression chamber in which compression has just started. This by-pass comprises preferably a pipe communicating with properly positioned openings through the flange 33 which openings are adapted to register with the openings 32 of the compression chambers. This utilization of all of the compressed gas serves to further increase the volumetric efficiency of the compressor.

In operation it may be found that a certain amount of the sealing fluid, such as oil, is discharged through the pipe 41 with the compressed gas. To compensate for any loss of the liquid in this manner and to maintain the level of liquid in the compression chambers substantially constant, a measured amount of oil may be fed into the compression chambers during suction. This may be accomplished, for example, by means of a pipe 44 communicating with the suction passage 36 and connected with a suitable oil supply. A valve 45 in the pipe 44 may be employed to regulate the amount of oil admitted. From the above, it will be seen that a depth of liquid is maintained in the outer portions of the compression chambers, thrown against the outer rotor 24 by centrifugal force and that the suction and the compression is accomplished by the recession and advancing of the liquid level relative to the center of the inner rotor. The compression chambers are effectually sealed by the liquid. The embodiment of the invention described is particularly adapted for compressing a gas, but it is to be understood that many features of the invention are equally adaptable to apparatus for pumping liquids and the like.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In apparatus of the nature of that herein described, in combination, a plurality of rotating chambers, means for admitting fluid to each of said chambers during rotation, means for compressing said fluid in each of said chambers successively, means for discharging said compressed fluid from each of said chambers successively, and means adapted after discharge from each of said chambers to lead compressed fluid remaining therein to another of said chambers in which a lower pressure prevails.

2. In apparatus of the nature of that herein described, in combination, a plurality of rotating chambers, means adapted to form an inlet passage to said chambers, means adapted to form an outlet passage from said chambers, means for opening said inlet passage to said chambers successively, means for decreasing the volume of said chambers successively, means for opening said outlet passage from said chambers successively, and means adapted after opening of said outlet passage from each of said chambers to connect the same with a succeeding chamber.

3. In apparatus of the nature of that herein described, in combination, a rotating chamber, liquid means within said chamber forming a seal therefor, means adapted to compress fluid within said chamber, means adapted to discharge said compressed fluid from said chamber, means adapted to supply additional liquid sealing means to said chamber during rotation, and means for regulating the amount of said liquid sealing means supplied at each rotation.

4. In apparatus of the nature of that herein described, in combination, a rotating casing member, an inner member eccentrically and rotatably mounted within said casing member, having a plurality of substantially radial recesses and means adapted to engage in driving relation with said casing, and a volume of liquid within said casing thrown outwardly by centrifugal force against the inner surface of said casing member and adapted to form a seal therewith at the mouths of said recesses to seal said recesses one from another and thus form separate compression chambers in which gas may be compressed against the surface of said liquid.

5. In apparatus of the nature of that herein described, in combination, a stationary shaft, a hollow casing member into which said shaft projects, adapted to rotate about said shaft and having a pair of bearings thereon and a third bearing independent of said shaft, an inner member eccentrically and rotatably mounted upon said shaft within said casing member and between said pair of bearings, said inner eccentric member having a plurality of substantially radially extending vanes adapted to coact adjacent their ends with the inner surface of said casing to cause said casing and eccentric inner member to rotate together.

6. In apparatus of the nature of that herein described, in combination, a stationary shaft, a hollow casing member into which said shaft projects and rotatably supported thereon, a member eccentrically and rotatably mounted upon said shaft within said casing adapted to rotate with said casing and having a plurality of substantially radial recesses forming with the inner wall of said casing a plurality of rotating chambers adapted to alternately increase and decrease in volume during rotation, a flange on said shaft along which moves the outer surface of the wall of said inner member forming one side of said chambers, openings through said wall one opening into each of said chambers, an inlet passage leading through said flange on said shaft, and an outlet passage leading through said flange, said inlet and outlet passages opening toward said wall and being adapted to register with said openings to said respective chambers at predetermined points in the rotation thereof.

7. In apparatus of the nature of that herein described, in combination, a stationary shaft, a hollow casing member into which said shaft projects, adapted to rotate about said shaft and having a pair of bearings thereon and a third bearing independent of said shaft, a member eccentrically and rotatably mounted upon said shaft within said casing and between said pair of bearings adapted to rotate with said casing and having a plurality of substantially radial recesses forming with the inner wall of said casing a plurality of rotating chambers adapted to alternately increase and decrease in volume during rotation, said shaft having a hollow end portion adapted to serve as an inlet passage, means adapted to form a passage between said inlet passage and said respective chambers as the volume of the latter increases, a conduit extending inwardly through said hollow portion of said shaft adapted to serve as an outlet passage, and means adapted to form a passage between said conduit and said respective chambers as the volume of the latter reaches substantially a minimum.

8. In apparatus of the nature of that herein described, in combination, an outer rotary member and an inner rotary member mounted eccentrically with respect to each other and forming therebetween a plurality of rotating chambers adapted to increase and decrease in volume as said eccentric members rotate, means adapted to admit to each of said chambers as the volume thereof increases a gas to be compressed, means adapted to discharge the compressed gas from each of said chambers as the volume thereof approaches a minimum, and means for introducing to said chambers with the gas to be compressed a quantity of liquid adapted to be thrown outwardly by centrifugal force and to seal said chambers one from another.

9. In apparatus of the nature of that herein described, in combination, an outer rotary member and an inner rotary member mounted eccentrically with respect to each other and forming therebetween a plurality of rotating chambers adapted to increase and decrease in volume as said eccentric members rotate, means adapted to admit to each of said chambers as the volume thereof increases a gas to be compressed, means adapted to discharge the compressed gas from each of said chambers as the volume thereof approaches a minimum, means for introducing to said chambers with the gas to be compressed a quantity of liquid adapted to be thrown outwardly by centrifugal force and to seal said chambers one from another, and means for controlling the amount of said liquid admitted to said chambers with said gas.

10. In apparatus of the nature of that herein described, in combination, an outer rotary member and an inner rotary member mounted eccentrically with respect to each other and forming therebetween a plurality of rotating chambers adapted to increase and decrease in volume as said eccentric members rotate, means adapted to admit to each of said chambers as the volume thereof increases a gas to be compressed, means adapted to discharge the compressed gas from each of said chambers as the volume thereof approaches a minimum, and means adapted subsequently to the operation of said discharge means to place the chamber in communication with another chamber in which compression has started.

11. In apparatus of the nature of that herein described, in combination, an outer rotary member and an inner rotary member mounted eccentrically with respect to each other and forming therebetween a plurality of rotating chambers adapted to increase and decrease in volume as said eccentric members rotate, a plurality of passages in said inner member communicating respectively with said chambers and opening thereinto adjacent the inner portions thereof, an inlet port for gas to be compressed, an exhaust port for the gas after compression, means adapted to place said passage of each of said chambers in communication with said inlet port as the volume of the chamber increases and adapted to place said passage thereof in communication with said exhaust port as the volume of the chamber approaches a minimum, means for admitting to said chambers a quantity of liquid adapted to be thrown by centrifugal force against the inner surface of said outer rotary member to seal said chambers one form another, and means for admitting to said chambers at will additional liquid to replace that discharged with the compressed gas.

12. In apparatus of the nature of that herein described, in combination, an outer rotary member and an inner rotary member mounted eccentrically with respect to each other and forming therebetween a plurality of rotating chambers adapted to increase and decrease in volume as said eccentric members rotate, a plurality of passages in said inner member communicating respectively with said chambers and opening thereinto adjacent the inner portions thereof, an inlet port for gas to be compressed, an exhaust port for the gas after compression, means adapted to place said passage of each of said chambers in communnication with said inlet port as the volume of the chamber increases and adapted to place said passage thereof in communication with said exhaust port as the volume of the chamber approaches a minimum, and a by-pass passage, the two ends of which are positioned to communicate respectively with the said passage of a chamber from which the compressed gas has just been discharged and the said passage of a chamber in which compression has just started.

In testimony whereof, I have signed my name to this specification this 8th day of January, 1924.

KNUD DE LONY.